Oct. 15, 1940.                O. STEINER                 2,218,494
                  PHOTOFLASH SYNCHRONIZER FOR CAMERAS
             Filed Oct. 17, 1939           6 Sheets-Sheet 1

Inventor:
Oscar Steiner;
By Emery, Booth, Townsend, Miller & Weidner
Attys Patented Oct. 15, 1940

2,218,494

UNITED STATES PATENT OFFICE 2,218,494

PHOTOFLASH SYNCHRONIZER FOR CAMERAS

Oscar Steiner, Irondequoit, N. Y., assignor to The Folmer Graflex Corporation, Rochester, N. Y., a corporation of Delaware Application October 17, 1939, Serial No. 299,827

14 Claims. (Cl. 67—29)

This invention relates to photoflash synchronizers for cameras, and more particularly to synchronizers for synchronizing photoflash bulbs with between-the-lens shutters, having special reference to shutters of the set type, namely, those shutters that require an operation for tensioning the shutter springs prior to making the actual exposure.

In order that the principle of the invention may be clearly understood, I have disclosed a single embodiment thereof in the accompanying drawings, wherein—

One object of my invention is to provide a photoflash synchronizer that can be attached to a shutter without the necessity of making any changes in the shutter itself other than, in the present embodiment of the invention, to make a very slight change in the shutter setting knob; another object of my invention is to provide a synchronizer that is readily adjustable so as to furnish the time delay between that instant when contact is made for firing the photoflash bulb and the instant that the shutter reaches the point of maximum opening; a further object is to provide a synchronizer for between-the-lens shutters and photoflash bulbs that can be wholly attached to the standard lens board, thus making unnecessary any alterations on the camera; a still further object is to provide a synchronizer for between-the-lens shutters for igniting photoflash bulbs, which is simple in construction though of a design readily lending itself to accurate manufacture at low cost; and finally, a still further object is to provide a flash synchronizer for between-the-lens shutters for firing flash bulbs, that is automatically cocked or set when the shutter is cocked or set.

This invention relates to photoflash synchronizers more especially pertaining to front shutters of the non-automatic or pre-set type. I have chosen to make this disclosure of an embodiment of the invention in connection with the well known Compur type of between-the-lens shutter having a re-set or setting device, making only an exceedingly slight change in the structure of one of the parts of such shutter.

It is a well known fact that there is a definite or distinct, considerable time lag in photoflash bulbs extending from the time or instant of making the electrical contact to the peak of the flash in the flash bulb. This time lag is substantially or quite uniform in bulbs of the same manufacture. Therefore, if there is provided means properly to adjust the time lag that occurs between the time the shutter is released and the time the contact is made, such means, having once been adjusted, will continue to function satisfactorily with other bulbs of the same manufacture. It is recognized that there is also a time lag in the shutter extending from the time that the shutter is released until it reaches its full open condition. However, this time lag is somewhat shorter than the time lag in the flash bulb as the shutters are usually constructed.

In accordance with my invention, I provide for compensating for the entire difference in time lag so that the flash bulb and the shutter opening can be accurately synchronized.

The camera to which the invention is intended to be applied may, of course, be of any suitable type, such, for example as the Speed Graphic camera. I have not, however, herein shown a camera, but I have represented the lens board of a camera at 20 in the several figures. In order to make clear the selected embodiment of the invention, which is directed to photoflash synchronizing means cooperating with a between-the-lens shutter, I have in Fig. 1 represented the said lens board 20 as having attached thereto the shutter flange 21 of a shutter 22, the said flange being attached to the lens board by screws 21a received in screw holes 21b of said lens board 20 (Figs. 3, 6 and 7), or in any other well known manner.

The shutter illustrated is of the well known Compur type, but my invention is not limited to this type of shutter as any shutter having a setting means is adaptable to this synchronizer. I have merely shown the Compur shutter as a satisfactory means for making the disclosure of my invention.

Figure 1:
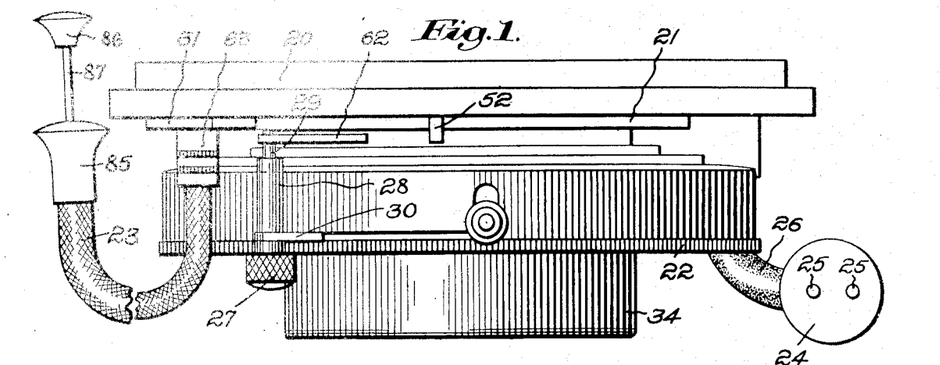
Fig. 1 is a top plan view of a shutter attached to a lens board having my synchronizer mounted thereon.
Figure 2:
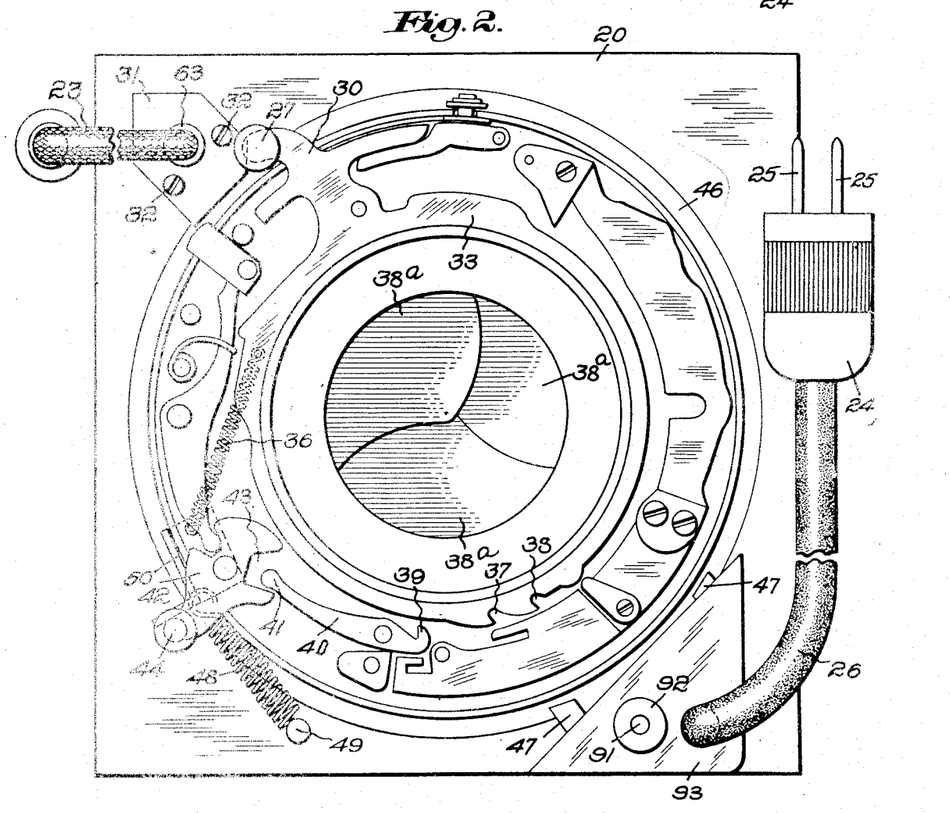
Fig. 2 is an elevational view of the lens board and shutter with the shutter top plate removed to show those parts of the shutter that are pertinent to a description or disclosure of the invention.
Figures 17, 18:
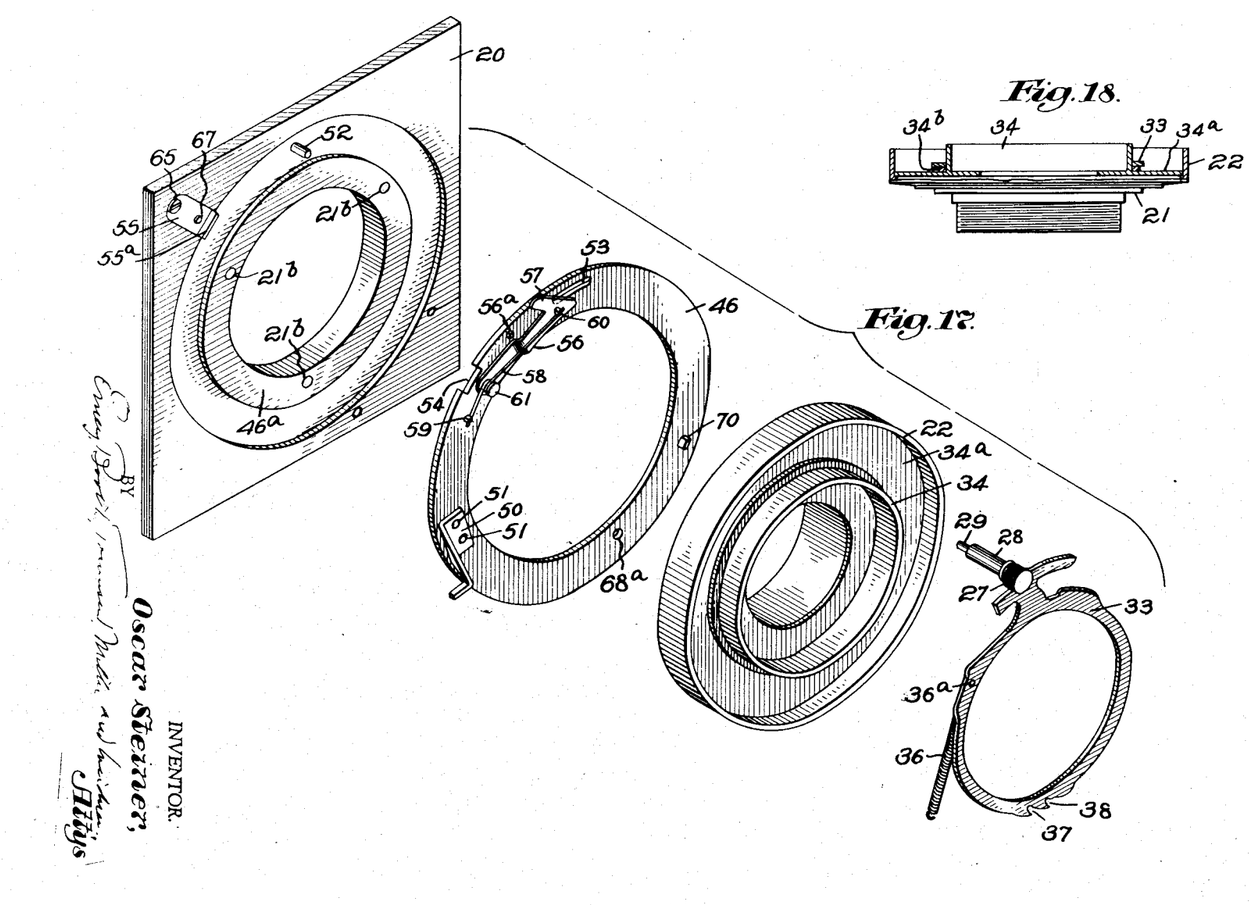
Fig. 17 is an exploded isometric view of the various parts of the mechanism.
Fig. 18 is a transverse section through the shutter, to show the position of the shutter actuating ring relative to other parts.

Referring more particularly to Figs. 1 and 2, the cable release is indicated at 23 and an attachment plug for connecting the synchronizer to the batteries and flash bulb is indicated at 24. Plug contacts are indicated at 25, 25, and a cable connecting the plug 24 with the synchronizer contacts is indicated at 26. A shutter-setting knob 27 is provided with an extension 28 having a reduced end or pin 29, shown most clearly in Figs. 1 and 17 and constituting the only alteration that it is necessary to make upon the shutter in order to render it adaptable to the present invention. The said shutter-setting knob 27 is attached to a lever 30 of the shutter 22, and constituting the shutter-setting lever. Any movement of the shutter-setting knob 27 causes a like movement of the extension 28, 29, the purpose whereof will be more fully set forth hereinafter. The cable release 23 is provided with an attachment plate or mounting bracket 31 which is held to the lens board 20 by screws 32, 32, as shown in Fig. 2. This structure will be more fully described at a later point in the specification.

The shutter-setting lever 30 is attached to a shutter-actuating ring 33, which rides around a portion of the inner barrel 34, best shown in Fig. 1, and is caused to be rotated in a contraclockwise direction under the influence of spring 36 secured at 36a, 36b, in a manner well known in the art. The said barrel 34 is an integral part of a lens mounting plate 34a, most clearly shown in Fig. 18. Underlying the shutter actuating ring 33 is a spacer ring 34b (Figs. 17 and 18) properly to position actuating ring 33 held in place by a projection on the shutter cover (not shown). The said shutter-actuating ring 33 is provided with notches 37, 38, but for the purpose of disclosing the present invention only the notch 37 will be referred to, inasmuch as the notch 38 has no function particularly cooperating with or participating in the present invention.

The shutter-actuating ring 33 is connected to shutter leaves, 38a, 38a in a manner to cause said leaves to open and close when said shutter-actuating ring 33 travels in a contraclockwise direction under the influence of spring 36, but they remain closed while said shutter-actuating ring 33 is returned in a clockwise direction to set position. This portion of the structure is also well known in the prior art and needs no further description at this point.

Figure 10:
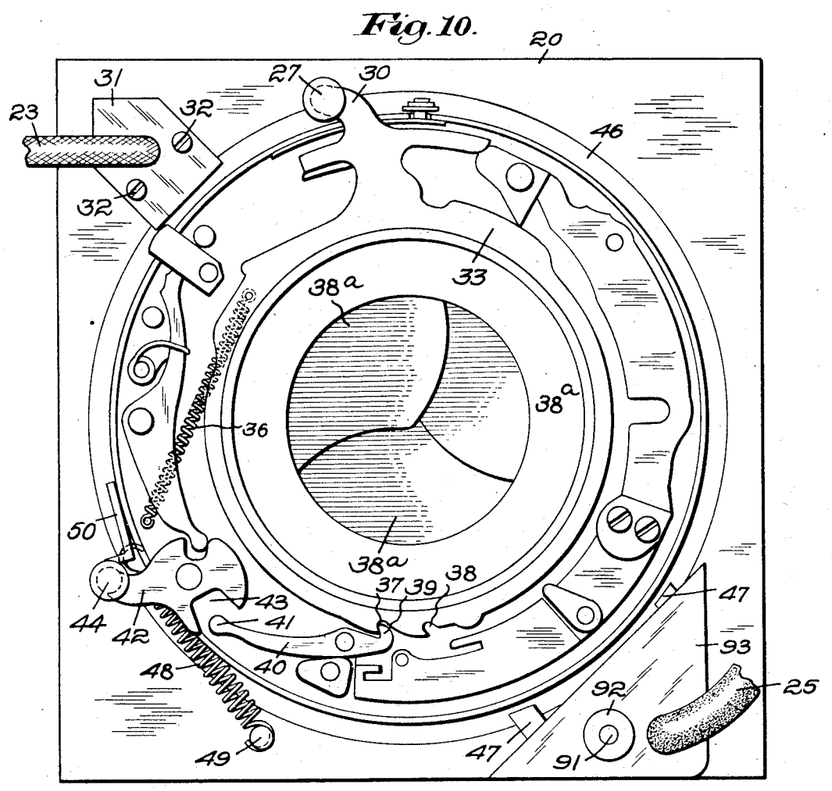
Fig. 10 is an elevational view similar to Fig. 2, but wherein the shutter setting mechanism is in the set or ready condition.
Figure 14:
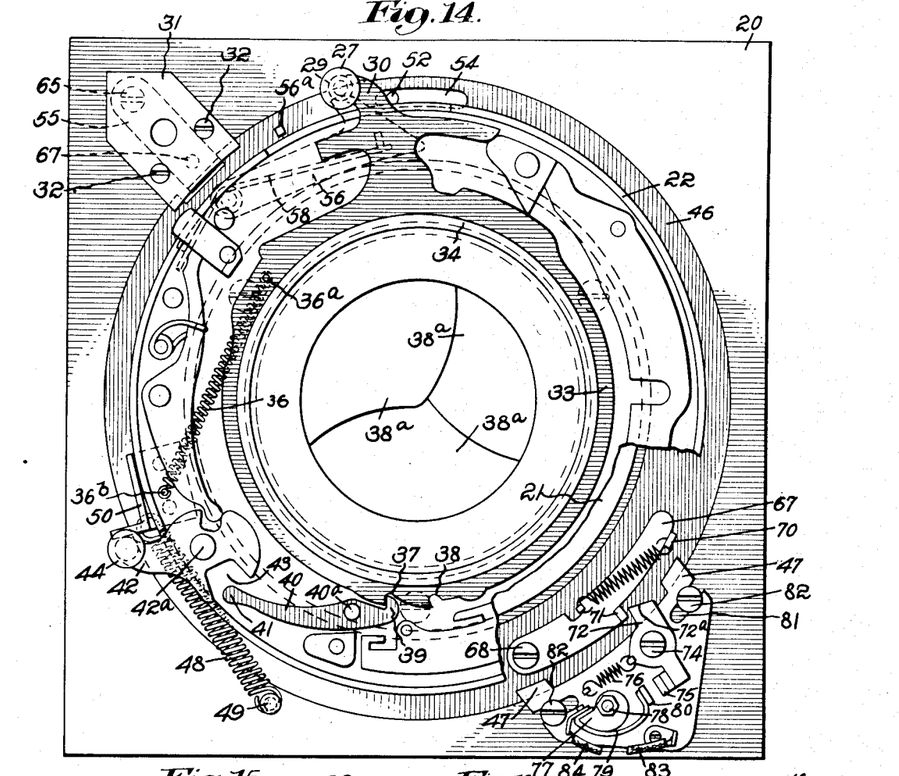
Fig. 14 is an elevational view of the shutter and synchronizing mechanism, mounted on a lens board, certain parts of the shutter being cut away more clearly to show certain parts of the mechanism which is in the set or ready position.

When the shutter-setting knob 27 is moved in a clockwise direction, carrying with it the shutter-setting lever 30, and shutter-actuating ring 33 with its notch 37 to the position shown in Figs. 10 and 14, a pawl or dog 39 of a lever 40 pivoted at 40a will engage said notch 37, thus holding the said shutter-actuating ring 33 in the position shown in Figs. 10 and 14. The said lever 40 has an arm 41 acted upon by a shutter-release lever 42 pivoted at 42a and having a notch 43 and a release knob 44. When the shutter-release knob 44 is moved downwardly viewing Fig. 2 (that is, when it is moved in a contraclockwise direction), the shutter-release lever 42 is caused to turn in a contraclockwise direction, causing the notch 43 to be moved to the position shown in Figs. 2 and 15, carrying with it the end 41 of said lever 40, and causing the pawl or dog 39 to rotate in a clockwise direction, thus pulling said dog or pawl 39 from the notch 37 of the said actuating ring 33, thereby releasing said ring 33, which thereupon returns to the position shown in Fig. 2, under the influence of spring 36, thus operating the shutter for any speed to which it has been previously set.

Figure 3:
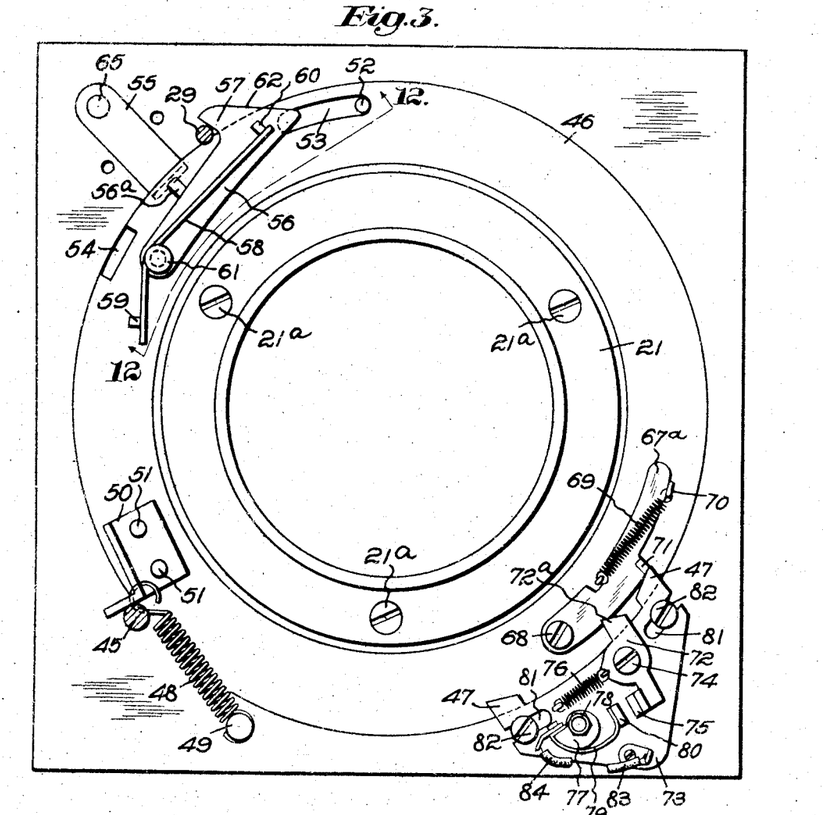
Fig. 3 is an elevational view of the lens board with the shutter removed, showing the synchronizer mechanism after it has been released.
Figure 11:
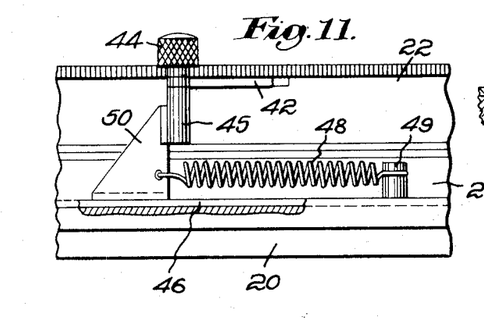
Fig. 11 is an enlarged detail of the synchronizer operating spring means.

The release knob 44 has extending therefrom a shaft 45 shown in Fig. 11 and shown in section in Fig. 3, wherein is also shown in section the extended portion 29 of the shutter-setting knob 27.

Figure 6:
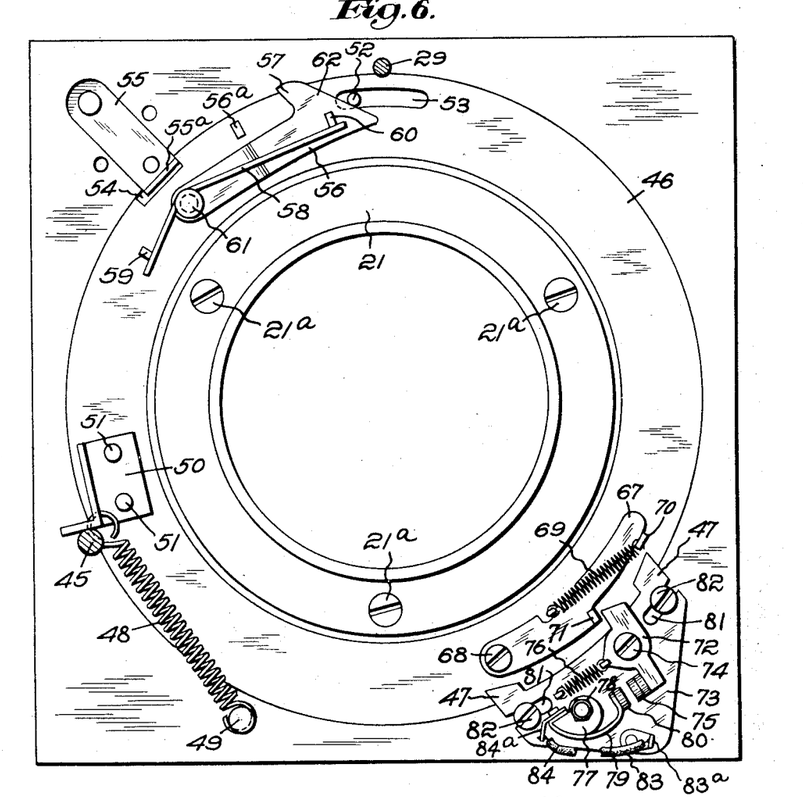
Fig. 6 is an elevational view similar to Fig. 3, but wherein the shutter synchronizing mechanism is in the set or ready condition.

In Fig. 3, the shutter itself is not shown, it having been removed, but the shutter flange 21 is shown in place on the lens board 20. Mounted about the outer diameter of the shutter flange 21 but spaced therefrom and in a suitable groove in the lens board 20, is a rotatable shutter-synchronizing ring or synchronizer 46 received in the annular space 46a, best shown in Fig. 17 held in place by bracket ends 47, 47 and plate 31. The said synchronizer ring 46 is free to turn about the shutter flange 21 and is caused to move in a contraclockwise direction under the influence of a spring 48 attached to a pin 49 mounted on the lens board 20, and the other end of the said spring 48 is attached to an angle plate 50 held to the synchronizer ring 46 by rivets 51, 51 as shown in Figs. 3 and 6. A pin 52 also shown in Fig. 3 is attached to the said lens board 20 and rides in a slot 53 of the said synchronizer ring 46, thus limiting the motion of the said synchronizer ring 46 which is provided with a notch 54 engaged at certain times by release pawl 55. The said synchronizer ring 46 is shown in Fig. 3 as in the released position, namely, that position to which it will travel after exposure is made, and the shutter is also at such time in the released position. The said release pawl 55 has an upturned lip 55a shown in Figs. 6, 7, 8, 9, to engage the notch 54.

Figure 12:
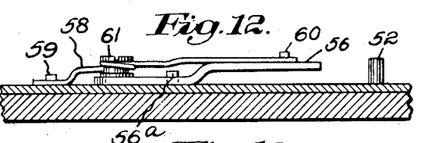
Fig. 12 is a detail sectional view through Fig. 3 on the line 12—12 thereof.

When the shutter is set by movement in a clockwise direction of the shutter-setting knob 27, the said shutter-synchronizing ring or synchronizer 46 is also carried in a clockwise direction under the influence of the reduced end or pin 29 co-acting with a lever 56 having a hooked end 57. The said lever 56 is caused to engage said reduced end or pin 29 by means of spring 58, one end of which is retained by a pin 59 on the ring 46 and the other end by a pin 60 on said lever 56. The motion of lever 56 is limited by a pin 56a. The said lever 56 is attached to the synchronizer ring 46 by means of a shoulder screw 61 shown in Figs. 3, 6 and 12. When the shutter setting knob 27 is moved in a clockwise direction viewing Fig. 3, the lever 56, pin 61, and synchronizer ring 46 are all caused to move in a clockwise direction, carrying with them the angle plate 50 and the tensioning spring 48 until the release pawl 55 drops into the notch 54 of the said synchronizer ring 46.

As the synchronizer ring 46 travels in a clockwise direction, a cam face 62 on the hooked end 57 of the lever 56 engages pin 52, as most clearly shown in Fig. 6, withdrawing said hooked end 57 of the lever 56 from the pin 29 of the shutter-setting knob 27. The said hooked end 57 leaves the pin 29 just as the release pawl 55 engages the slot 54 of the synchronizer ring 46, thus permitting the shutter-setting knob 27 to continue in its travel clockwise sufficiently far to allow the notch 37 to be engaged by the pawl 39 of lever 40, as clearly shown in Figs. 10 and 14.

It is necessary to have the connecting means between the synchronizer ring 46 and the shutter re-set knob 27 disengaged when set because the synchronizer ring 46 is released prior to the release of the shutter-actuating ring 33. Therefore, if the hooked end 57 of the lever 56 were not disengaged from the pin 29, the said synchronizer ring 46 could not move until the shutter was released. However, in the present disclosure of the invention, it is necessary first to release the synchronizer ring 46, which in turn operates the shutter in a manner which I will now describe.

Figure 7:
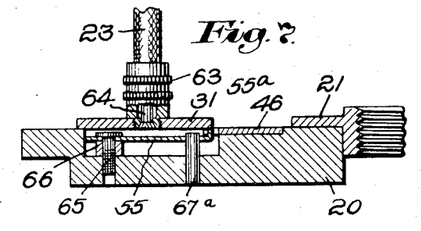
Fig. 7 is a cross sectional detail of the cable release operating mechanism when the shutter is set or in the ready condition.
Figure 8:
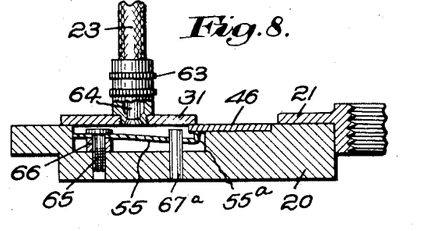
Fig. 8 is a sectional view similar to Fig. 7, but with the synchronizing mechanism as in Fig. 3—that is, after release.
Figure 9:
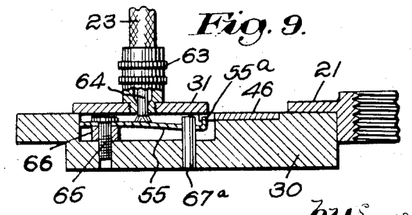
Fig. 9 is a sectional view similar to Fig. 7, but at the instant of being released.

Referring to Fig. 7, the cable release 23 is shown as provided with a threaded end portion 63 received in a suitably threaded hole in the attachment plate 31. The said cable release 23 is also provided with a plunger 64 shown retracted in Fig. 7. As shown in Fig. 9, the plunger 64 has been projected by pressure on the cable release 23 in the usual manner, thus causing said plunger 64 to engage the pawl 55 and release it from the notch 54 of the synchronizer ring 46. Said Fig. 9 shows the pawl 55 in the act of being released at its upturned lip 55a, but not yet fully released. The pawl 55 is held in place by means of a screw 65 threaded into the lens board 20, and the said pawl 55 is separated therefrom by a spacing washer 66. On the opposite end of the release pawl 55 from the screw 65 is a guide pin 67 also fitted to the lens board 20, this structure being most clearly shown in Figs. 7, 8 and 9.

To the synchronizer ring 46 is attached a contact tripping lever 67a pivoted to said synchronizer ring 46 by means of a shoulder screw 68 in screw hole 68a (Fig. 17), and it is caused to move in a contraclockwise direction, viewing Fig. 6, by a spring 69 attached to a stop pin 70 and to said lever 67a. When the shutter is in the set or ready position, the synchronizer mechanism will be in the position shown in Figs. 4, 6 and 14.

Figure 4:
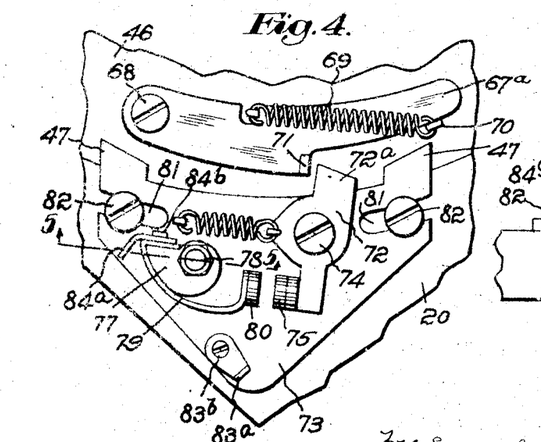
Fig. 4 is an enlarged detail of the contact mechanism.

The upturned part 71 of lever 67a is shown in Fig. 6 in the position to engage the contact lever 72 which is fastened to a contact plate 73 by means of a shoulder screw 74. One end of the said contact lever 72 carries a contact 75 and the other end is provided with a cam face 72a. The contact lever 72 is held in the position shown by means of spring 76, one end of which is attached to the lever 72 and the other end to the contact plate 73. The said plate is also provided with an insulating block 77 held to the plate 73 by means of a nut 78, and it has attached thereto a contact spring 79 having a contact 80. The said contact plate 73 is provided with adjusting slots 81, 81, and is held to the lens board 20 by means of screws 82, 82. Said slots 81, 81 and said screws 82, 82 provide means for adjusting the contact plate 73 and the contact mechanism readily with respect to the upturned part 71 of the lever 67a, thus providing means for changing the timing of contacts 75 and 80. As best shown in Fig. 4, the contact plate 73 having the contact 75 is connected to a circuit wire 83 by means of a lug 83a and a screw 83b, and the contact spring 79 is connected to a circuit wire 84 by means of a lug 84a and screw 84b, also shown in Fig. 4. The said circuit wires 83 and 84 make up the cable 26, as most clearly shown in Fig. 2.

The operation of parts for making an exposure is as follows:

The cable release 23, as shown in Fig. 1, is provided with an enlarged sleeve 85, a knob 86 and a plunger 87. Pressure on the knob 86 will cause the plunger 87 to be thrust downward in the cable 23. Within the said cable 23 is a second cable (not shown) which is attached to and extends from the rod 87 to the plunger 64, shown in Figs. 7, 8 and 9. When the knob 86 is pushed downward, the pin 64 will cause the release pawl 55 to be moved into and beyond the position shown in Fig. 9, retracting the release pawl 55 from the notch 54 of the synchronizer ring 46, which is now free to turn in a contraclockwise direction viewing Fig. 6, under the influence of spring 48, into the position shown in Fig. 3. As the synchronizer ring 46 travels in a contraclockwise direction, the angle plate 50 causes the pin 45 of the shutter-release knob 44 on the shutter-release lever 42 (shown in Figs. 10, 11 and 14) to be moved in a contraclockwise direction, and the lever end 41 is caused to move in a clockwise direction under the influence of the notch 43 of the release lever 42, thus moving the hooked end 39 of the lever 40 out of engagement with the notch 37 of the shutter-actuating ring 33, thus allowing the shutter to operate. As the shutter actuating ring 33 travels in a contraclockwise direction during the operation of the shutter, the lever 56 will be caused to be moved in a clockwise direction under the influence of pin 29 passing over the face 62 of said lever 56, thus restoring pin 29 to a position to be engaged by the hooked end 57 of said lever 56.

Figure 13:
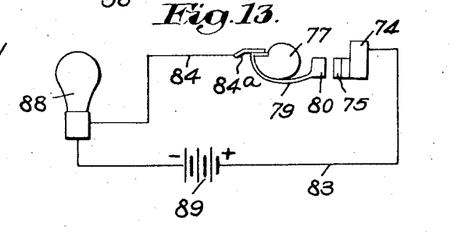
Fig. 13 is a circuit diagram of the synchronizer battery and photoflash bulb.

At the same time that the shutter is being operated or slightly earlier, depending on the adjustment of the contact plate 73, the upturned part 71 of the lever 67a engages the lever 72, causing said latter lever 72 to be rotated about its pivot 74, closing the contacts 75 and 80, and thereby completing a circuit through the flash lamp 88 and the battery 89, as indicated in Fig. 13, causing the photoflash or ignition to take place. The synchronizer ring 46 continuously travels until it reaches the released position shown in Fig. 3, and it is then stopped by the end of slot 53 engaging the pin 52, the upturned part 71 having passed the contact lever 72. Both the shutter and the synchronizer are then in position to be re-set for a second exposure.

Figure 15:
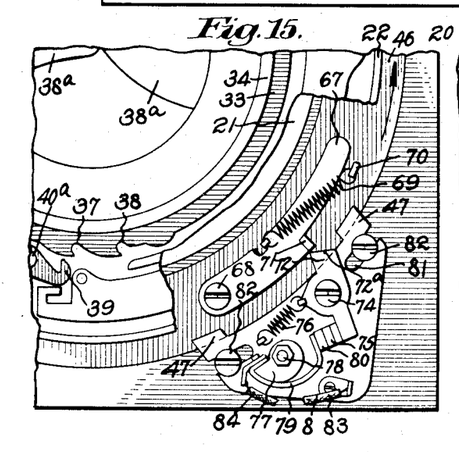
Fig. 15 is a fragmentary view, similar to Fig. 14, but showing the synchronizing contacts closed.
Figure 16:
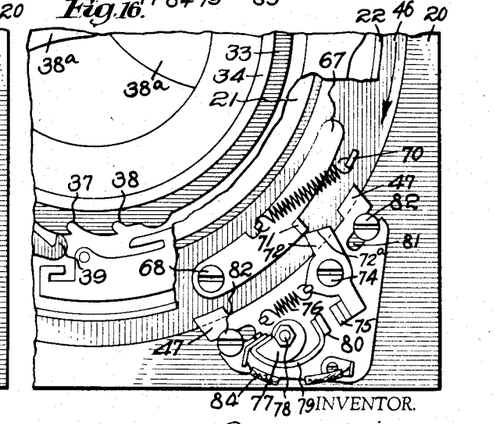
Fig. 16 is a view similar to Fig. 15 but showing the position of parts when the shutter is being cocked, thus showing the condition of the synchronizing mechanism at such time.

As the synchronizer ring 46 is re-set from the position shown in Fig. 3 into the position shown in Figs. 6 and 14, the lever 67a is carried bodily in a clockwise direction and its upturned end 71 will in such movement contact with the beveled end 72a of lever 72, causing the latter to be rotated in a contraclockwise direction, thereby allowing the upturned end 71 to pass the cam face 72a. This motion is necessary to prevent the contact points 75 and 80 being closed while resetting the said synchronizer ring 46. If this precaution were not taken and the flash bulb 88 were in its socket, the said flash-bulb would be ignited when the shutter was set, rather than when the shutter was released. When the contact points 75 and 80 are closed, as indicated in Fig. 15, current will pass from the positive end of battery 89 through wire 83, contact plate 73, contact arm screw 74, contact arm 72, contact 75, contact 80, contact spring 79, lug 84a, wire 84 and photoflash bulb 88, and therefrom to the negative wire and the battery 89 (diagram Fig. 13).

Figure 5:
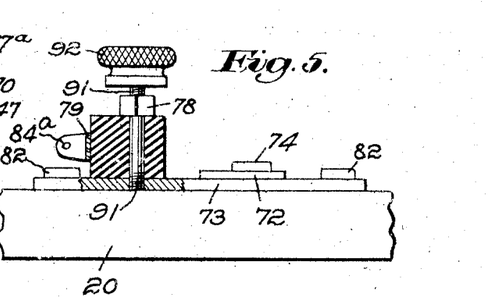
Fig. 5 is a cross section of Fig. 4 on the line 5—5 thereof.

The structure of the insulating block 77 is more clearly shown in Fig. 5, wherein the block 77 is shown as attached to the plate 73 by means of a stud 90 having a nut 78. An extension 91 of stud 90 has threaded thereon a thumb nut 92 for retaining a synchronizer cover 93 (most clearly shown in Figs. 2 and 10). The electric cable 26 passes through a hole in the said cover 93.

It will be understood from the foregoing description that the synchronizer herein disclosed is very simple in construction and can be manufactured at very low cost. Moreover the synchronizer will retain its accuracy of adjustment throughout a long period of use. It will also be understood that the device is very easy to service or repair, since the entire mechanism is of very simple construction.

Having thus described one illustrative embodiment of the invention, it is to be understood that although specific terms are employed, they are used in a generic and descriptive sense and not for purposes of limitation, the scope of the invention being set forth in the following claims.

I claim:

1. In mechanism for synchronizing the photoflash lamp and the shutter of a photographic camera, a settable synchronizer member mounted for to-and-fro setting and released movements adjacent to the lens and shutter of the camera, said shutter having a turnable shutter-actuating ring, said ring and said member having interengageable parts positioned on said ring and member respectively, to effect the said setting of the synchronizer member by the usual setting movement of the shutter-actuating ring; said member and said ring having interengageable parts positioned on said member and ring respectively, to release the shutter-actuating ring for shutter-exposure movement by the released movement of the synchronizer member, means to release said synchronizer member, an electric circuit including the photoflash lamp and including contacts; and means caused by movement of said synchronizer member to close said contacts during the released movement of said synchronizer member.

2. In mechanism for synchronizing the photoflash lamp and the between-the-lens shutter of a photographic camera, a settable synchronizer ring turnable for setting the same, said ring being concentrically positioned with respect to the usual turnable settable shutter-actuating ring of said shutter; said rings having interengageable parts positioned on said rings respectively, to effect the said setting of the synchronizer ring by the usual setting movement of the shutter-actuating ring; said rings having interengageable parts positioned on said rings respectively, to release the shutter-actuating ring for shutter-exposure movement by the released movement of the synchronizer ring; means to release the synchronizer ring; an electric circuit including the photoflash lamp and including contacts; and means positioned on the synchronizer ring to close said contacts during the released movement of said synchronizer.

3. In mechanism for synchronizing the photoflash lamp and the between-the-lens shutter of a photographic camera, said shutter having a turnable settable shutter-actuating ring, a settable synchronizer ring turnable for setting the same, said two rings occupying a concentric, adjacent relation; said rings having interengageable parts positioned on said rings respectively, to effect the setting of the synchronizing ring by the setting movement of the shutter-actuating ring; said rings having interengageable parts positioned on said rings respectively, to release the shutter-actuating ring for shutter-exposure movement by the released movement of the synchronizer ring; means to release the synchronizer ring; an electric circuit including the photoflash lamp and including contacts; and means positioned on the synchronizer ring to close said contacts during the released movement of said synchronizer ring.

4. A combination according to claim 1, in which means is provided to adjust the position of said contacts, thereby to vary the timing of the contact-closing action of the said means positioned on the synchronizer member.

5. A combination according to claim 1, in which a support is provided adjacent to the synchronizer member, the said contacts being mounted on said support, and in which combination means is provided to adjust said support in the direction of a movement of said synchronizer member.

6. A combination according to claim 1, in which the releasing means for the synchronizer member includes a pawl-like member engageable with a formation on the synchronizer member.

7. A combination according to claim 2, in which the releasing means for the synchronizer ring includes a pawl-like member engageable with a formation on the synchronizer ring, and also includes a cable-release to release said pawl-like member from the synchronizer ring.

8. A combination according to claim 1, in which the means on the synchronizer member to close said contacts is a part yieldable in one direction of movement of the said member and non-yieldable in the other direction of movement and therefore causing the said contact-closing on the opposite (i. e. released) movement of said member.

9. A combination according to claim 1, in which the setting-interengageable parts of said ring and member include a lever pivoted upon the synchronizer member, and a part on the shutter actuating ring that is engaged by said lever in the setting operation.

10. A combination according to claim 1, in which the setting-interengageable parts of said ring member include a lever pivoted upon the synchronizer member, and in which combination means is provided to move said lever to disengage said parts in effecting the said setting operation.

11. A combination according to claim 2, in which to constitute the said interengageable parts that effect the said setting operation of the synchronizer ring, the between-the-lens shutter has the setting knob thereof prolonged to engage a part upon the synchronizer ring thereby to move the synchronizer ring into setting position upon setting movement of the shutter actuating ring.

12. A combination according to claim 1, in which the camera has a detachable lens board and in which the synchronizer member is mounted for movement upon the said lens board of the camera, outside the lens of said camera.

13. A combination according to claim 2, in which there is a support for the said contacts adjacent to the synchronizer ring, and in which combination one of said contacts is pivoted so as to be moved against the other contact by the released movement of the synchronizer ring.

14. A combination according to claim 2, in which separate springs are provided to cause, when permitted, the released movements of the synchronizer ring and the shutter-operating ring respectively.

OSCAR STEINER.